United States Patent [19]
Hasegawa et al.

[11] Patent Number: 5,616,907
[45] Date of Patent: Apr. 1, 1997

[54] OPTICAL READING APPARATUS

[75] Inventors: Kazuo Hasegawa; Junichi Ouchi, both of Miyagi-ken, Japan

[73] Assignee: Alps Electric Co., Ltd., Tokyo, Japan

[21] Appl. No.: 511,505

[22] Filed: Aug. 4, 1995

[30] Foreign Application Priority Data

Aug. 12, 1994 [JP] Japan ................................. 6-190539

[51] Int. Cl.⁶ .................................................. G06K 7/10
[52] U.S. Cl. ........................................................ 235/462
[58] Field of Search ................................... 235/462, 472, 235/455

[56] References Cited

U.S. PATENT DOCUMENTS

| | | | |
|---|---|---|---|
| 4,072,859 | 2/1978 | McWaters | 250/214 R |
| 4,488,678 | 12/1984 | Hara et al. | . |
| 4,734,566 | 3/1988 | Senda et al. | 235/455 |
| 4,743,773 | 5/1988 | Katana et al. | 235/472 |
| 5,258,605 | 11/1993 | Metlitsky et al. | 235/462 |
| 5,308,962 | 5/1994 | Havens et al. | 235/462 |
| 5,406,062 | 4/1995 | Hasegawa et al. | 235/462 |
| 5,468,950 | 11/1995 | Hanson | 235/472 |
| 5,521,366 | 5/1996 | Wang et al. | 235/472 |
| 5,532,467 | 7/1996 | Roustaei | 235/472 |

*Primary Examiner*—Donald T. Hajec
*Assistant Examiner*—Mark Tremblay
*Attorney, Agent, or Firm*—Guy W. Shoup; Patrick T. Bever

[57] ABSTRACT

An optical reading apparatus including an LED array for projecting light onto bar codes formed on a paper surface, a line sensor for receiving reflected light from the bar codes, a bar code reading unit for processing bar code reading signals obtained by the line sensor and for obtaining decoded signals of the bar codes, and a drive control unit for driving the LED array and the line sensor, wherein the LED array is divided into a plurality of sets, and a paper detecting unit detects whether a paper surface is present or not based on a bar code reading signal and supplies a paper surface detection signal to a drive control unit when the paper surface is detected, and the drive control unit drives the plurality of LED sets to emit light in sequence when a paper surface is not detected, and to emit light simultaneously when a paper surface detection signal is generated by the paper detecting unit.

9 Claims, 5 Drawing Sheets

OPTICAL READING APPARATUS

BACKGROUND OF THE INVENTION

1. Field of the Invention

The present invention relates to optical reading apparatuses such as a bar code scanner, and more particularly to an optical reading apparatus such as a bar code scanner for reading bar codes, where low power consumption power of the whole apparatus is intended without deteriorating the inherent bar code reading function.

2. Prior Art

In the prior art, in a bar code scanner (optical reading apparatus) using a line sensor in a bar code reading unit, in order to reduce the consumption power at the non-use state (when bar codes are not read), means for reducing the consumption power have been proposed as follows.

A first means for reducing power consumption comprises an operation start switch provided at the bar code scanner, where only when the operation start switch is pushed, electric power is supplied to a plurality of light projection elements, i.e., a light emission diode (LED) array and light is projected to the bar codes, and when the operation start switch is not pushed, electric power is not supplied to the LED array. Thus according to the first means for reducing power consumption, the power consumption during the non-use state can be sufficiently reduced.

Although the first means for reducing power consumption can securely reduce power consumption during at the non-use state, since the operation start switch must be pushed every time a bar code is read, the reading operation of bar codes becomes troublesome and also the ratio of generation of incorrect operation becomes high.

This point is improved in second means for reducing power consumption as hereinafter described. The second means for reducing power consumption controls the lighting state of the LED array without installing an operation start switch. During use state, when it is detected that the number of bar codes read by the line sensor is a prescribed value or more, electric power is supplied to the whole LED array simultaneously and light of the prescribed light amount is projected to the bar codes. On the other hand, at the non-use state, when it is detected that the number of bar codes read by the line sensor is a prescribed value or less, electric power is supplied in sequence to the whole LED array intermittently and light of the minimum amount is projected to the bar codes. Thus according to the second means for reducing power consumption, when the bar code scanner is not used, the power consumption can be reduced by a considerable amount, and when the non-use state is transferred to the use state, the bar codes can be detected at once.

Figure 5:
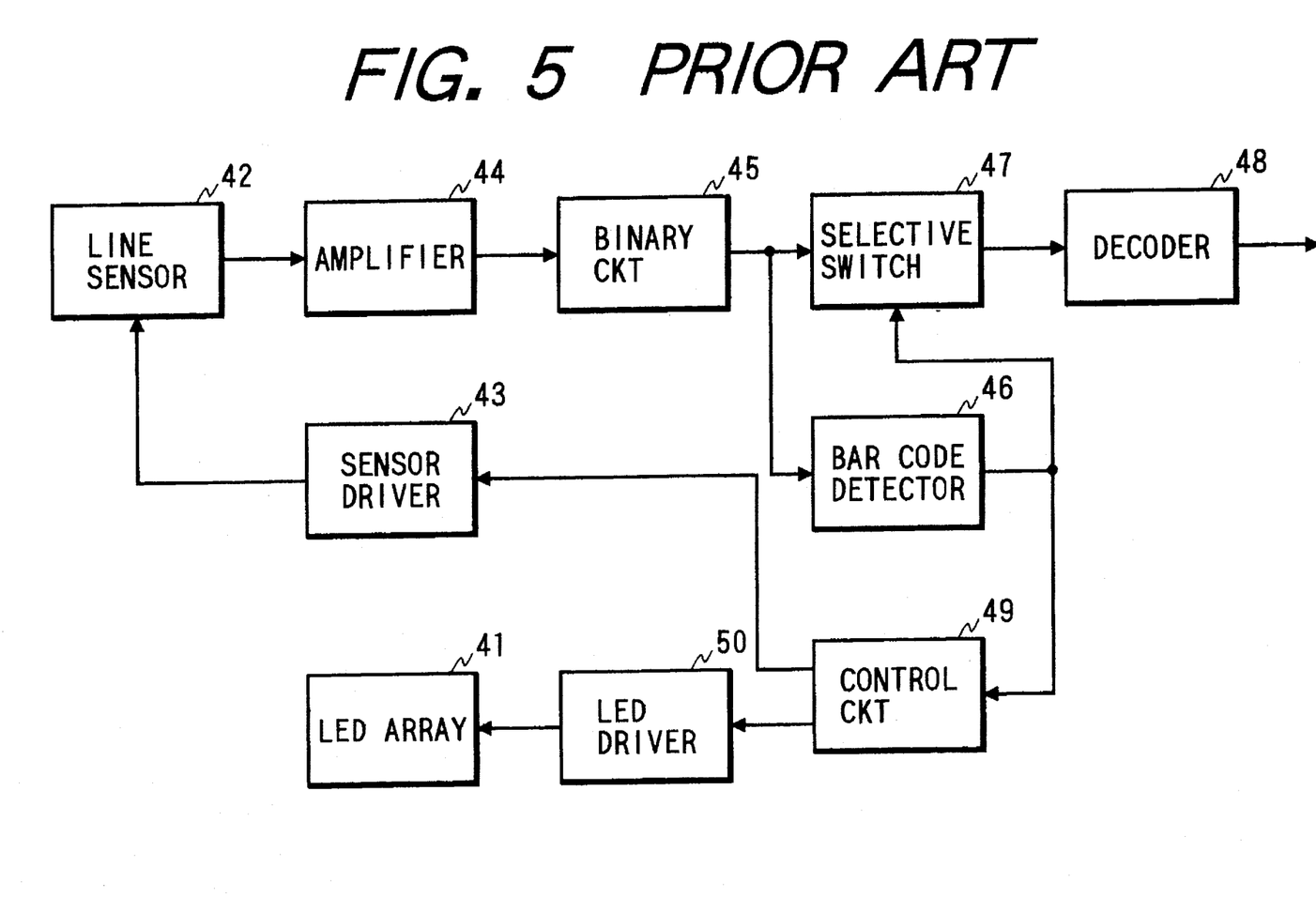
FIG. 5 is a block constitution diagram showing an example of an optical reading apparatus already known provided with means for reducing power consumption power.

FIG. 5 is a block constitution diagram showing an example of a bar code scanner (optical reading apparatus) already known provided with the second means for reducing the consumption power.

In FIG. 5, an LED array 41 is constituted by a plurality of LEDs and the whole LEDs project light to bar codes (not shown). A line sensor 42 is constituted by a series of light reception elements comprising a plurality of photo diodes, photo transistors and the like, and detects reflected light from the bar codes. A sensor driver 43 scans a series of light reception elements of the line sensor 42 in sequence by scan signals, and transmits bar code reading signals out of the line sensor 42. An amplifier 44 amplifies the bar code reading signals transmitted out of the line sensor 42 to a prescribed level. A binary circuit 45 converts the bar code reading signals amplified by the amplifier 44 into binary signals. A bar code detector 46 counts the number of bar codes included in the binary signals obtained in the binary circuit 45, and detects whether the number is not less than a prescribed value, that is, whether it is not less than the number of bar codes obtained when a bar code scanner reads the bar codes. The bar code detector 46 outputs a bar code detection signal only when the number of the bar codes is not less than the prescribed value, for example, bar codes of the black color are four in number and space parts of the white color are five or more in number. A selective switch 47 is turned on by a bar Code detection signal from the bar code detector 46, and connects between output of the binary circuit 45 and input of a decoder 48. The decoder 48 decodes binary signals outputted from the binary circuit 45, and supplies the decoded outputs to a succeeding host device (not shown). When a bar code detection signal is supplied from the bar code detector 46, a control circuit 49 simultaneously drives all plural LEDs in the LED array 41 through an LED driver 50. On the other hand, when no bar code detection signal is supplied from the bar code detector 46, the control circuit 49 intermittently drives all plural LEDs in the LED array 51 through the LED driver 50.

The bar code scanner (optical reading apparatus) already known according to the above-mentioned constitution operates as follows.

At first, operation at the non-use state of the bar code scanner is as follows. If the line sensor 42 is scanned by drive of the sensor driver 43, a bar code detection signal is obtained from the line sensor 42. The bar code detection signal is amplified to a prescribed level by the amplifier 44 and then supplied to the binary circuit 45 and converted into a binary signal there. Subsequently the binary signal is supplied to the bar code detector 46 and the selective switch 47, and since the line sensor 42 does not read bar codes then, bar codes of the prescribed number or more cannot be counted from the binary signal in the bar code detector 46 and no bar code detection signal is outputted from the bar code detector 46. Since the selective switch 47 is not supplied with the bar code detection signal and its contacts remain open, the binary signal is inhibited by the selective switch 47 and is not supplied to the decoder 48 therefore also the decoder 48 does not supply the decoded output to the host device. Since also the control circuit 49 is not supplied with the bar code detection signal, plural LEDs of the LED array 41 are driven intermittently. Thus at the non-use state of the bar code scanner, since the plural LEDs of the LED array 41 are driven intermittently, consumption of the drive power can be reduced in comparison with that driving all LEDs of the LED array 41. In addition, when the plural LEDs are driven intermittently, if the bar code scanner is transferred to the use state, even in the intermittent drive, since all LEDs are once made the drive state, the line Sensor 42 can read the bar codes and the bar code detector 46 can count the number of the bar codes among the binary signals obtained by binary notation of the bar code detection signals.

Next, operation at the use state of the bar code scanner is as follows. If the line sensor 42 is scanned by drive of the sensor driver 43 in similar manner to the preceding case, bar code detection signals are obtained from the line sensor 42. The bar code detection signals are amplified to a prescribed level by the amplifier 44, and then supplied to the binary circuit 45 and converted into binary signals there. Subsequently the binary signals are supplied to the bar code detector 46 and the selective switch 47. Then since the line sensor 42 reads the bar codes in normal state, the bar code detector 46 counts the number of the bar codes in the prescribed number or more from the binary signals, and the bar code detection signals are outputted from the bar code detector 46 and supplied to the selective switch 47 and the control circuit 49. Since the selective switch 47 has its contacts closed by supply of the bar code detection signals, the binary signals are supplied through the selective switch 47 to the decoder 48 and the decoded output of the decoder 48 is supplied to the host device. The control circuit 49 is changed by the supply of the bar code detection signals so that simultaneous drive is carried out to the plural LEDs of the LED array 41. Thus when the bar code scanner is transferred to the use state, since the simultaneous drive is carried out to the plural LEDs of the LED array 41, the bar codes can be read with high efficiency.

According to the bar code scanner (optical reading apparatus) already known provided with the second means for reducing the power as above described, although the number of bar codes (linear record) can be read in the line sensor 42 certainly, since the light projection amount as a whole is little, there is a problem in that it cannot be detected whether a paper surface (information record surface) with bar codes (linear record) printed thereon exists or not.

However, in such an optical reading apparatus (bar code scanner) already known, if changing is carried out so that length of the drive time for the plural LEDs of the LED array 41 is elongated and length of the non-drive time is shortened, it can be detected whether a paper surface (information record surface) with bar codes (linear record) printed thereon exists or not, but in this case, there is a problem in that the power consumption of the bar code scanner (optical reading apparatus) is increased and the intended reduction of the power consumption cannot be attained.

SUMMARY OF THE INVENTION

In order to solve the above-mentioned problems in the prior art, an object of the present invention is to provide an optical reading apparatus which can attain reduction of the power consumption and can detect an information record surface provided with a linear record medium.

In order to attain the foregoing object, the present invention is provided with the first means in an optical reading apparatus comprising a plurality of light projection elements for projecting light to a linear record area on an information record surface, a series of light reception element for receiving reflected light from the linear record area, an information reading unit for processing a record medium reading signal obtained from the light reception element and obtaining a decoded signal of the linear record and a drive control unit for driving the plural light projection elements and the light reception element, wherein the plural light projection elements are classified into plural sets, and a record surface detection unit is installed for detecting whether the information record surface exists or not based on the record medium reading signal and for supplying a record surface detection signal to the drive control unit when the information record surface is detected, and the drive control unit drives the plural light projection elements to emit light in each set in sequence when the record surface detection signal is not supplied, and drives all plural light projection elements to emit light simultaneously when the record surface detection signal is supplied.

Also in order to attain the foregoing object, the present invention is provided with the second means in an optical reading apparatus comprising a plurality of light projection elements for projecting light to a linear record area on an information record surface, a series of light reception element for receiving reflected light from the linear record area, an information reading unit for processing a record medium reading signal obtained from the light reception element and obtaining a decoded signal of the linear record, and a drive control unit for driving the plural light projection elements and the light reception element, wherein the plural light projection elements are classified into plural sets, and a record surface detecting unit is provided for detecting whether the information record surface exists or not based on the record medium reading signal and for supplying a record surface detection signal to the drive control unit when the information record surface is detected, and also a record detecting unit is provided for counting the number of the linear record based on the record medium reading signal and for supplying a record medium detection signal to the drive control unit when the number of the linear record is the prescribed number or more, and the drive control unit drives all plural light projection elements to emit light simultaneously when the record surface detection signal and/or the record medium detection signal are supplied, and drives the plural light projection elements to emit light in each set in sequence at other cases.

In the first means, a plurality of light projection elements are classified into plural sets, and a record surface detecting unit is provided. The record surface detecting unit detects whether an information record surface exists or not based on a record medium reading signal obtained from a series of light reception element, and supplies a record surface detection signal to a drive control unit when existence of the information record surface is detected. The drive control unit drives the plural light projection elements so that when a record surface detection signal is not supplied, the light projection elements classified into plural sets emit light in each set in sequence alternately, on the other hand, when a record surface detection signal is supplied, all light projection elements classified into plural sets emit light simultaneously.

Thus according to the first means, when the optical reading apparatus is not used, the light projection elements classified into plural sets emit light in each set in sequence alternately, and at lest, it can be detected whether an information record surface exists or not, and the consumption power is reduced to the utmost. On the other hand, when the optical reading apparatus is used, all light projection elements classified into plural sets emit light simultaneously, and detection of the record medium and the detection of existence of the information record surface are carried out with high sensitivity.

Also in the second means, a plurality of light projection elements are classified into plural sets, and a record surface detecting unit and a record detecting unit are provided respectively. The record surface detecting unit detects whether an information record surface exists or not based on a record medium reading signal obtained from a series of light reception element, and supplies a record surface detection signal to a drive control unit when existence of the information record surface is detected. Also the record detecting unit counts the number of a elements in a linear record based on a record medium reading signal obtained from the series of light reception element, and supplies a record medium detection signal to the drive control unit when the number of the linear record is the prescribed number or more. The drive control unit drives all light projection elements classified into plural sets to emit light simultaneously only when the record surface detection signal and/or the record medium detection signal are supplied, and drives the light projection elements classified into plural sets to emit light in each set in sequence alternately at other cases.

Thus according to the second means, in similar manner to the first means, when the optical reading apparatus is not used, the light projection elements classified into plural sets emit light in each set in sequence alternately, and at least, it can be detected whether an information record surface exists or not, and the consumption power is reduced to the utmost. On the other hand, when the optical reading apparatus is used, all light projection elements classified into plural sets emit light simultaneously, and detection of the record medium and detection of existence of the information record surface are carried out with high sensitivity.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DESCRIPTION OF THE PREFERRED EMBODIMENTS

Embodiments of the present invention will be described in detail referring to the accompanying drawings as follows.

Figure 1:
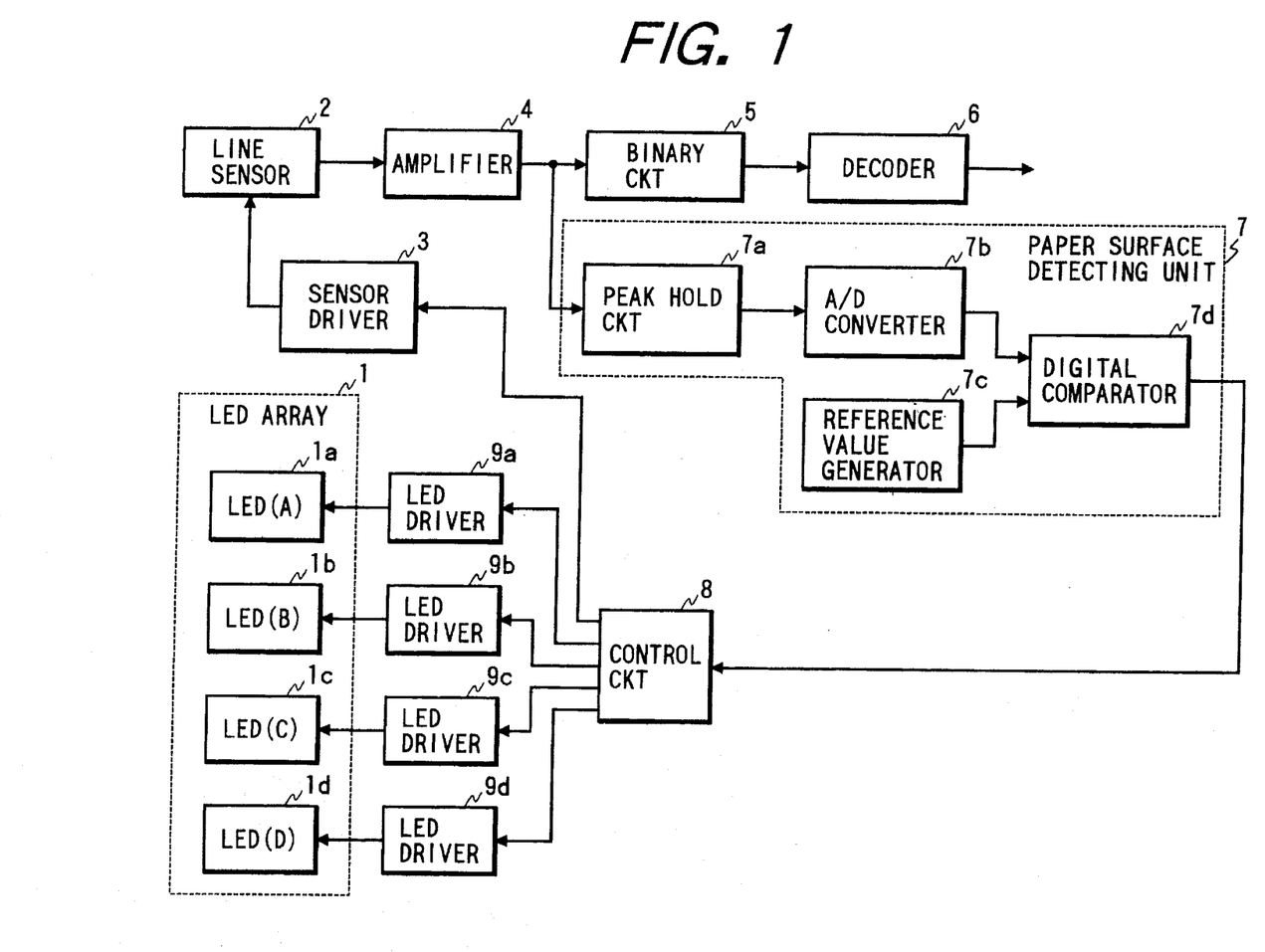
FIG. 1 is a block constitution diagram showing configuration of an optical reading apparatus in the first embodiment of the invention.

FIG. 1 is a block constitution diagram showing configuration of an optical reading apparatus in the first embodiment of the present invention, and shows an example of a bar code scanner as optical reading apparatus. Also FIGS. 2(a) through 2(h) are operation explanation diagrams showing two operation examples when plural LED sets are driven in sequence alternately.

In FIG. 1, an LED (light emission diode) array 1 comprises a plurality of LEDs (light projection elements), and these plural LEDs are classified into plural sets. In an example shown in FIG. 1, plural LEDs are classified into four LED sets 1a, 1b, 1c, 1d comprising A to D, and the whole LEDs project light to bar codes (linear record; not shown). A line sensor 2 is constituted by a series of light reception elements comprising plural photo diodes, photo transistors and the like, and detects reflected light from the bar codes. A sensor driver 3 scans in sequence a series of light reception element constituting the line sensor 2 by scan signals, and leads bar code reading signals (record medium reading signals) out of the line sensor 2. An amplifier 4 amplifies the bar code reading signals led out of the line sensor 2 into a prescribed voltage level. A binary circuit 5 converts the bar code reading signals amplified by the amplifier 4 into binary signals. A detector 6 decodes the binary signals outputted from the binary circuit 5, and supplies the decoded outputs to a succeeding host device (not shown). A paper surface detecting unit (information record surface detecting unit) 7 comprises a peak hold circuit 7a for holding the peak value of the amplified bar code reading signals, an analog-to-digital converter 7b for converting the held peak value into the first digital value, a digital reference value generator 7c for generating the second digital value as reference, and a digital comparator 7d for comparing the first and second digital values and generating a paper surface detection signal (record surface detection signal) when the first digital value is larger than the second digital value. If the paper surface detection signal is supplied from the paper surface detecting unit 7, a control circuit 8 energizes four LED drivers 9a, 9b, 9c, 9d simultaneously and drives the plural LED sets 1a, 1b, 1c, 1d of the LED array 1 simultaneously. On the other hand, if the paper surface detection signal is not supplied from the paper surface detecting unit 7, the control circuit 8 energizes the four LED drivers 9a, 9b, 9c, 9d in sequence alternately and drives the plural LED sets 1a, 1b, 1c, 1d of the LED array 1 in sequence alternately. In this case, the line sensor 2, the amplifier 4, the binary circuit 5 and the decoder 6 constitute an information reading unit, and the control circuit 8, the sensor driver 3 and the four LED drivers 9a to 9d constitute a drive control unit.

The bar code scanner of this embodiment in the above-mentioned configuration operates as follows.

Figure 2A:
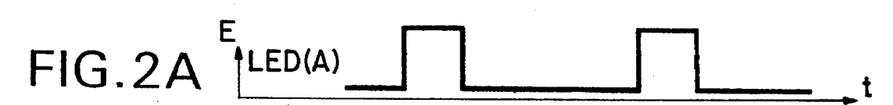
FIGS. 2(a) through 2(h) are operation explanation diagrams showing two operation examples when plural LED sets are driven in sequence alternately in embodiments of the invention.

At first, the operation will be described at the non-use state of the bar code scanner, that is, when bar codes are not read by the bar code scanner. If the line sensor 2 is scanned by drive of the sensor driver 3, bar code detection signals will be generated from the line sensor 2. The bar code detection signals are amplified to a prescribed voltage level by the amplifier 4, and then supplied to the binary circuit 5 and converted into binary signals there. Subsequently the binary signals are supplied to the decoder 6, and since the bar codes are not read and the bar code information is not included in the binary signals then, a decoded signal is not obtained in the decoder 6 and a decoded output is not supplied to a succeeding host device. Also when the amplified bar code detection signals are applied to the paper surface detecting unit 7, first, the peak hold circuit 7a holds the peak value of the amplified bar code detection signals, and next, the analog-to-digital converter 7b converts the held peak value into a digital signal and generates the first digital value. Subsequently, the digital comparator 7d compares the first digital value with the second digital value obtained from the digital reference value generator 7c, and since the bar codes are not read then, the first digital value is considerably small in comparison with the second digital value, thereby a paper surface detection signal is not generated in the output of the digital comparator 7d and is not supplied to the control circuit 8. The control circuit 8 energizes the four LED drivers 9a, 9b, 9c, 9d in sequence alternately and drives the four LED sets 1a, 1b, 1c, 1d of the LED array 1 provided corresponding to the four LED drivers 9a, 9b, 9c, 9d in sequence alternately, and causes the four LED sets 1a, 1b, 1c, 1d to emit light in sequence alternately. In this case, emission of the four LED sets 1a, 1b, 1c, 1d in sequence alternately may be done as shown in FIGS. 2(a)

through 2(d) so that the drive state of one LED set and the drive state of next LED set are not overlapped, that is, when the preceding LED set becomes the non-drive state, next LED set may be driven to the drive state. Otherwise, as shown in FIGS. 2(e) through 2(h), the emission may be done so that the drive state of one LED set and the drive state of next LED set are partly overlapped, that is, before the preceding LED set becomes the non-drive state, next set may be driven to the drive state.

Next, at the use state of the bar code scanner, that is, when bar codes are read by the bar code scanner, the operation is as follows. Also in this case, if the line sensor 2 is scanned by drive of the sensor driver 3, bar code detection signals will be generated from the line sensor 2. The bar code detection signals are amplified to a prescribed voltage level by the amplifier 4, and then supplied to the binary circuit 5 and converted into binary signals there. Subsequently the binary signals are supplied to the decoder 6, and since the bar codes are read and the bar code information is included in the binary signals then, a decoded signal is obtained in the decoder 6 and a decoded output is supplied to a succeeding host device. Also when the amplified bar code detection signals are applied to the paper surface detecting unit 7, the peak hold circuit 7a holds the peak value of the amplified bar code detection signals, and next, the analog-to-digital converter 7b converts the held peak value into a digital signal and generates the first digital value. Subsequently, the digital comparator 7d compares the first digital value with the second digital value obtained from the digital reference value generator 7c, and since the bar codes are read then, the first digital value becomes larger than the second digital value and a paper surface detection signal is generated in the output of the digital comparator 7d and is supplied to the control circuit 8. The control circuit 8 energizes the four LED drivers 9a, 9b, 9c, 9d simultaneously in response to the supply of the paper surface detection signal and drives the four LED sets 1a, 1b, 1c, 1d of the LED array 1 corresponding to the four LED drivers 9a, 9b, 9c, 9d simultaneously, and causes the four LED sets 1a, 1b, 1c, 1d to emit light simultaneously.

In the first embodiment, the condition of the four LED sets 1a, 1b, 1c, 1d transferring in sequence from the alternate emission state to the simultaneous emission state is in that a paper surface with bar codes printed thereon is detected by the paper surface detecting unit 7 and a paper surface detection signal is outputted from the paper surface detecting unit 7. On the other hand, the condition of the four LED sets 1a, 1b, 1c, 1d transferring in sequence from the simultaneous emission state to the alternate emission state is in that output of the paper surface detection signal from the paper surface detecting unit 7 is stopped. In the LED array 1, it is preferable that the paper surface is detected by the paper surface detecting unit 7, for example, when at least two LEDs among one LED set emit light.

Also in the first embodiment, when a paper surface detection signal is not outputted from the paper surface detecting unit 7, such configuration may be taken that operation of the decoder 6 is stopped.

Thus according to the first embodiment, when the bar code scanner is at the non-use state, since the four LED sets 1a, 1b, 1c, 1d of the LED array 1 are driven in sequence alternately, the drive power consumption can be reduced significantly in comparison with the case that all LEDs of the LED array 1 are driven. Moreover in the LED array 1, since light is emitted in each of the four LED sets 1a, 1b, 1c, 1d, such state can be avoided that the light emission amount of the LED array 1 is too little for the detection of the paper surface with the bar codes printed thereon, and when the paper surface with the bar codes printed thereon is conveyed into the reading region of the LED array 1, the paper surface can be detected immediately. On the other hand, when the bar code scanner is at the use state, since the four LED sets 1a, 1b, 1c, 1d of the LED array 1 are driven simultaneously, the detection of the paper surface with the bar codes printed thereon and the reading of the bar codes can be carried out with high efficiency. When the bar code scanner is transferred from the use state to the non-use state, immediately after the above-mentioned process, the four LED sets 1a, 1b, 1c, 1d are transferred in sequence to the alternately driven state, and the consumption power can be reduced in the state that the paper surface with the bar codes printed thereon can be detected.

Figure 3A:
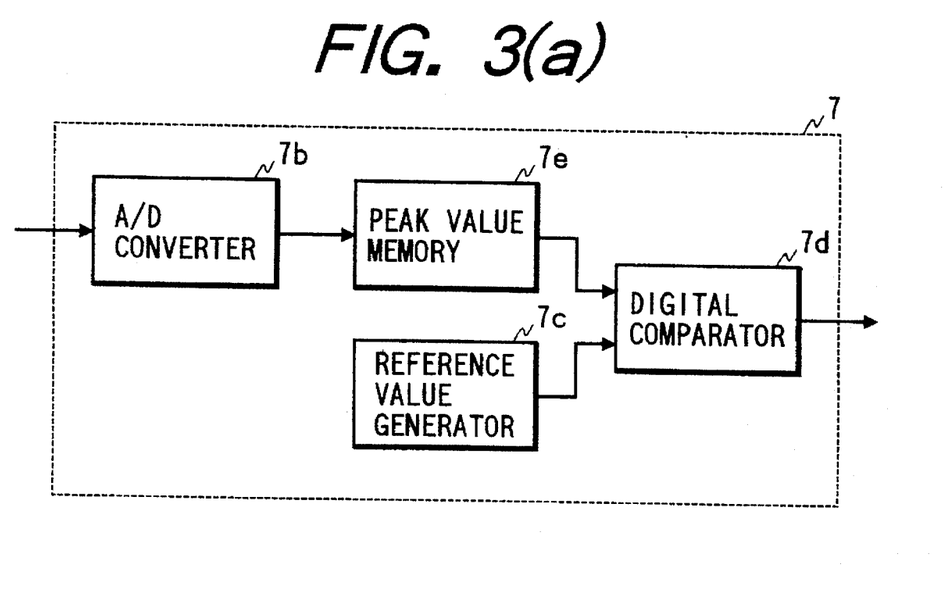
FIG. 3(a) and 3(b) are block constitution diagrams showing other configuration examples of a paper surface detecting unit in embodiments of the invention.
Figure 3B:
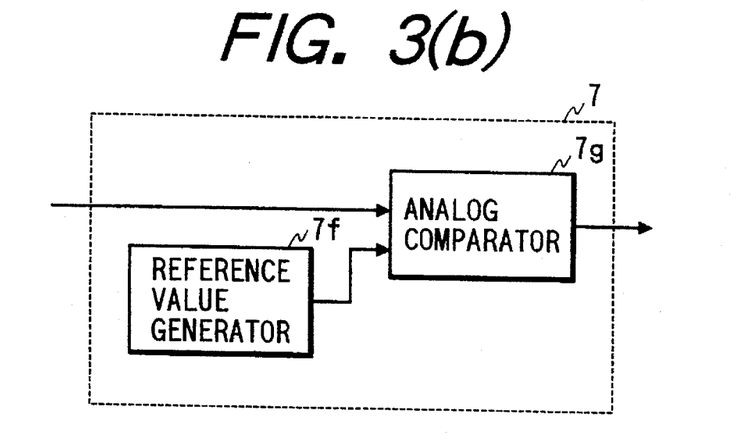

FIG. 3 is a block constitution diagram showing two other configuration examples of the paper surface detecting section (information record surface detecting section) 7 in the first embodiment. FIG. 3(a) shows the first example, and FIG. 3(b) shows the second example respectively.

In FIG. 3(a), a paper surface detecting section 7 comprises an analog-to-digital converter 7b for converting amplified bar code reading signals into digital signals, a peak value memory 7e for storing the peak value of the digital signals, a digital reference value generator 7c for generating the second digital value as reference, and a digital comparator 7d for comparing the first digital value indicating the peak value of the peak value memory 7e with the second digital value from the digital reference value generator 7c, and for generating a paper surface detection signal (record surface detection signal) when the first digital value is larger than the second digital value.

According to the paper surface detecting unit 7 as the first example, in comparison with the paper surface detecting unit 7 in the first embodiment, it is advantageous that a peak hold circuit 7a becomes unnecessary and the bar code scanner can be easily realized on a microcomputer for synthetic control, but the load of the microcomputer is increased significantly and a microcomputer with high speed and high cost becomes necessary.

Also in FIG. 3(b), the paper surface detecting unit 7 comprises an analog reference value generator 7f for generating the second analog value as reference, and an analog comparator 7g for comparing the first analog value in the amplified bar code reading signals with the second analog value from the analog reference value generator 7f and generating a paper surface detection signal (record surface detection signal) when the first analog value is larger than the second analog value.

According to the paper surface detecting unit 7 as the second example, in comparison with the paper surface detecting unit 7 in the first embodiment, it is advantageous in that the circuit configuration becomes quite simple and the load of the microcomputer is decreased significantly, but component parts other than those of the microcomputer are required and during the manufacturing, the adjusting work of the second analog value as reference voltage is required.

Figure 4:
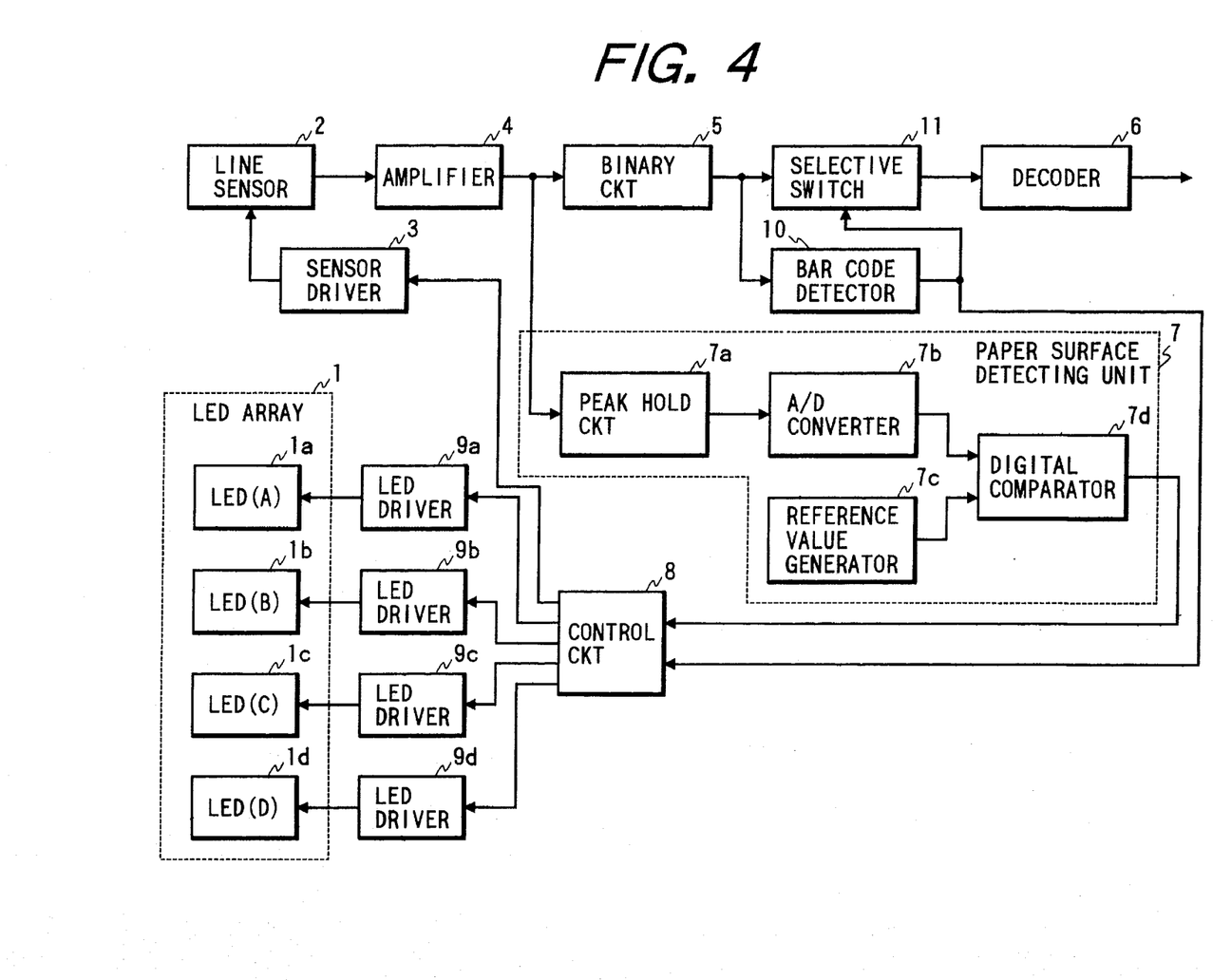
FIG. 4 is a block constitution diagram showing configuration of an optical reading apparatus in the second embodiment of the invention.

Subsequently FIG. 4 is a block constitution diagram showing configuration of an optical reading apparatus in the second embodiment of the present invention, and an example of a bar code scanner is shown as optical reading apparatus in similar manner to the first embodiment.

In FIG. 4, a bar code detector (record detecting unit) 10 counts the number of bar codes (linear record) included in the inputted binary signals, and when the bar codes of the prescribed value or more are included in the binary signals, for example, when the four bar codes of the black color and the five or more space parts of the white color are included, the bar code detector 10 generates a bar code detection signal (record medium detection signal) which is supplied to a selective switch 11 and a control circuit 8. The selective switch 11 is connected and arranged between a binary circuit 5 and a decoder 6, and connects the binary circuit 5 and the decoder 6 at the supply state of the bar code detection signal and produces the non-connected state between the binary circuit 5 and the decoder 6 at the non-supply state of the bar code detection signal.

Comparing the second embodiment with the first embodiment, in the second embodiment, the bar code detector 10 is provided at the output side of the binary circuit 5 and the bar code detection signal from the bar code detector 10 is supplied to the control circuit 8, whereas in the first embodiment, such a bar code detector 10 is not provided and the bar code detection signal is not supplied to the control circuit 8. Also in the second embodiment, the selective switch 11 of the bar code detector 10 is provided and the bar code detection signal from the bar code detector 10 is supplied to the selective switch 11, whereas in the first embodiment, such a selective switch 11 is not provided. Except for the above-mentioned points, there is no difference in configuration between the second embodiment and the first embodiment. Consequently, since configuration of the second embodiment is clear from the above description in configuration and the description in configuration of the first embodiment already described, further description shall be omitted.

The bar code scanner (optical reading apparatus) of the second embodiment in the above-mentioned configuration operates as follows.

First, operation will be described at the non-use state of the bar code scanner, that is, when bar codes are not read in the bar code scanner. If the line sensor 2 is scanned by drive of the sensor driver 3, bar code detection signals are obtained from the line sensor 2. The bar code detection signals are amplified to a prescribed voltage level by the amplifier 4, and then supplied to the binary circuit 5 and converted into binary signals there. Subsequently, the binary signals are supplied to the bar code detector 10 and the selective switch 11, and since the line sensor 2 does not read bar codes then, the bar code detector 10 cannot count the number of the bar codes of the prescribed value or more among the binary signals and cannot output a bar code detection signal. Since the selective switch 11 is not supplied with a bar code detection signal and its contacts remain open, the binary signals are inhibited by the selective switch 11 and are not supplied to the decoder 6, which does not supply a decoded output to a succeeding host device. Also when the amplified bar code detection signals are applied to the paper surface detecting unit 7, the peak hold circuit 7a holds the peak value of the amplified bar code detection signals, and the analog-to-digital converter 7b converts the held peak value into a digital signal and generates the first digital value, and the digital comparator 7d compares the first digital value with the second digital value obtained from the digital reference value generator 7c. Then since the line sensor 2 does not read the bar codes, the first digital value becomes considerably small in comparison with the second digital value and the digital comparator 7d does not output a paper surface detection signal.

Figures 2B, 2C, 2D:
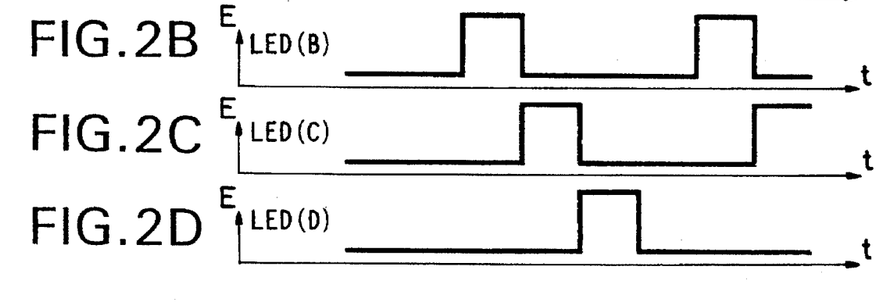
Figures 2E, 2F:
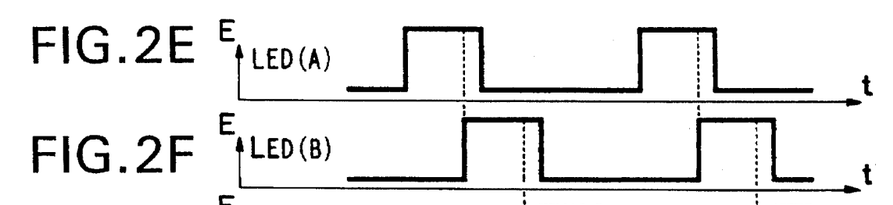
Figures 2G, 2H:
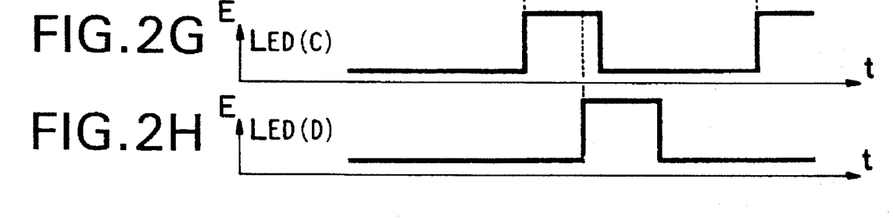

In this case, the control circuit 8 is supplied with neither the bar code detection signal from the bar code detector 10 nor the paper surface detection signal from the digital comparator 7d of the paper surface detecting unit 9, the four LED drivers 9a, 9b, 9c, 9d are energized in sequence alternately an the four LED sets 1a, 1b, 1c, 1d of the LED array 1 provided corresponding to the four LED drivers 9a, 9b, 9c, 9d are driven in sequence alternately, and the four LED sets 1a, 1b, 1c, 1d are caused to emit light in sequence alternately. Also in this case, emission of the four LED sets 1a, 1b, 1c, 1d in sequence alternately may be done as shown in FIG. 2(a) so that the drive state of one LED set and the drive state of next LED set are not overlapped, that is, when the preceding LED set becomes the non-drive state, next LED set may be driven to the drive state. Otherwise, as shown in FIG. 2(b), the the emission may be done so that the drive state of one LED set and the drive state of next LED set are partly overlapped, that is, before the preceding LED set becomes the non-drive state, next LED set may be driven to the drive state.

Next, at the use state of the bar code scanner, that is, when bar codes are read by the bar code scanner, the operation will be described as follows. If the line sensor 2 is scanned by drive of the sensor driver 3, bar code detection signals will be obtained from the line sensor 2. The bar code detection signals are amplified to a prescribed voltage level by the amplifier 4, and then supplied to the binary circuit 5 and converted into binary signals there. Subsequently the binary signals are supplied to the bar code detector 10 and the selective switch 11. Since the line sensor 2 reads the bar codes in normal state then, the bar code detector 10 counts the number of the bar codes of the prescribed value or more among the binary signals and outputs bar code detection signals. Since the selective switch 11 is supplied with the bar code detection signals from the bar code detector 10 thereby its contacts are closed, the binary signals are supplied through the selective switch 11 to the decoder 6. The decoder 6 decodes the bar code information included in the binary signals and supplies the decoded output to a succeeding host device. Also when the amplified bar code detection signals are applied to the paper surface detecting unit 7, the peak hold circuit 7a holds the peak value of the amplified bar code detection signals, and the analog-to-digital converter 7b converts the held peak value into a digital signal and generates the first digital value, and the digital comparator 7d compares the first digital value with the second digital value obtained from the digital reference value generator 7c. Then since the line sensor 2 reads the bar codes in normal state, the first digital value becomes larger than the second digital value and the digital comparator 7d generates a paper surface detection signal.

In this case, since the control circuit 8 is supplied with both the bar code detection signal from the bar code detector 10 and the paper surface detection signal from the digital comparator 7d of the paper surface detecting unit 7, the four LED drivers 9a, 9b, 9c, 9d are energized simultaneously and the four LED sets 1a, 1b, 1c, 1d of the LED array 1 provided corresponding to the four LED drivers 9a, 9b, 9c, 9d are driven simultaneously, and the four LED sets 1a, 1b, 1c, 1d are caused to emit light simultaneously.

In the second embodiment, the condition of the four LED sets 1a, 1b, 1c, 1d transferring in sequence from the alternate emission state to the simultaneous emission state is in that a paper surface with bar codes printed thereon is detected by the paper surface detecting unit 7 and a paper surface detection signal is outputted from the paper surface detecting unit 7 and/or that the number of the bar codes of the prescribed value is detected by the bar code detector 10 and a bar code detection signal is outputted from the bar code detector 10. On the other hand, the condition of the four LED sets 1a, 1b, 1c, 1d transferring in sequence from the simultaneous emission state to the alternate emission state is in that output of the paper surface detection signal from the paper surface detecting unit 7 is stopped and output of the bar code detection signal from the bar code detector 10 is stopped. It is preferable that the detection of existence of the paper surface and the detection of the prescribed number of the bar codes are set so that the paper surface can be detected by the paper surface detecting unit 7 when, for example, at lest two LEDs in one LED set in the LED array 1 emit light and the bar codes can be detected by the bar code detector 10.

Also in the second embodiment, configuration of the paper surface detecting unit 7 may be changed to that shown in FIG. 3(a) or that shown in FIG. 3(b).

Thus according to the second embodiment, at the non-use state of the bar code scanner, since the four LED sets 1a, 1b, 1c, 1d of the LED array 1 are driven in sequence alternately, the drive power consumption can be significantly reduced in comparison with the case that all LEDs of the LED array 1 are driven. Moreover in the LED array 1, since the light emission is carried out in each of the four LED sets 1a, 1b, 1c, 1d, such state can be avoided that the light emission amount of the LED array i is too little for the detection of the paper surface with the bar codes printed thereon and the detection of the number of elements of the bar codes, and when the paper surface with the bar codes printed thereon is conveyed into the reading region of the LED array 1, immediately the paper surface can be detected and the number of elements of the bar codes can be detected. On the other hand, at the use state of the bar code scanner, since the four LED sets 1a, 1b, 1c, 1d of the LED array 1 are driven simultaneously, the detection of the paper surface with the bar codes printed thereon, the detection of the number of elements of the bar codes and the reading of the bar codes can be carried out with high efficiency. When the bar code scanner is transferred from the use state to the non-use state, immediately after the above-mentioned process, the four LED sets 1a, 1b, 1c, 1d are transferred in sequence to the alternately driven state, and the consumption power can be reduced in the state that the paper surface with the bar codes printed thereon can be detected and the number of element of the bar codes can be detected.

In each of the above-mentioned embodiments, although the description has been done in the case that an example of the optical reading apparatus is a bar code scanner, the optical reading apparatus according to the present invention is not limited to a bar code scanner but, of course, can be applied also to an apparatus similar to a bar code scanner.

Also in each of the above-mentioned embodiments, although the description has been done in an example that the plural LEDs are classified into the four LED sets 1a, 1b, 1c, 1d, the classification of the LEDs in the present invention is not limited to four, but, of course, classification in five, six or more may be done. In this case, if the number of the LEDs assembled to one set is two or more, any number can be selected.

As above described, in the first embodiment of the invention, a plurality of light projection elements (LED) are classified into plural sets 1a to 1d, and a record surface detecting unit (paper surface detecting unit) 7 is provided. The record surface detecting unit 7 detects whether an information record surface (paper surface) exists or not based on a record medium reading signal (bar code reading signal) obtained from a series of light reception element (line sensor) 2, and supplies a record surface detection signal (paper surface detection signal) to a drive control unit (control circuit) 8 when existence of the information record surface is detected. The drive control unit 8 drives the light projection elements classified into plural sets 1a to 1d so that when the record surface detection signal is not supplied, the light projection elements in each set emit light in sequence alternately, and when the record surface detection signal is supplied, all of the light projection elements emit light simultaneously.

Thus according to the first embodiment, when an optical reading apparatus (bar code scanner) is not used, the light projection elements classified into plural sets 1a to 1d emit light in each set in sequence alternately, and at least, it can be detected whether the information record surface exists or not, and the consumption power can be reduced to the utmost. On the other hand, when the optical reading apparatus is used, all of the light projection elements classified into plural sets 1a to 1d emit light simultaneously, and the detection of the record medium and the detection of existence of the information record surface can be carried out with high sensitivity.

Also in the second embodiment of the invention, a plurality of light projection elements are classified into plural sets 1a to 1d, and a record surface detecting unit (paper surface detecting unit) 7 and a record detecting unit (bar code detector) 10 are provided respectively. The record surface detecting unit 7 detects whether an information record surface (paper surface) exists or not based on a record medium reading signal (bar code reading signal) obtained from a series of light reception element (line sensor) 2, and supplies a record surface detection signal (paper surface detection signal) to a drive control unit (control circuit) 8 when existence of the information record surface is detected. Also the record detecting unit (bar code detector) 10 counts the number of elements of a linear record (bar code) based on a record medium reading signal obtained from a series of light reception element 2, and supplies a record medium detection signal to the drive control unit 8 when the number of elements of the linear record is the prescribed number or more. The drive control unit 8 drives the light projection elements classified into plural sets 1a to 1d so that only when the record surface detection signal and/or the record medium detection signal are supplied, all of the light projection elements emit light simultaneously, and at other cases, the light projection elements in each set emit light in sequence alternately.

Thus according to the second embodiment, when an optical reading apparatus (bar code scanner) is not used, the light projection elements classified into plural sets 1a to 1d emit light in each set in sequence alternately, and at least, it can be detected whether the information record surface exists or not, and the power consumption power can be reduced to the utmost. On the other hand, when the optical reading apparatus is used, all of the light projection elements classified into plural sets 1a to 1d emit light simultaneously, and the detection of the record medium and the detection of existence of the information record surface can be carried out with high sensitivity.

What is claimed is:
1. An optical reading apparatus comprising:
 a plurality of light projection elements for projecting light to a linear record area on an information record surface;
 a light reception element for receiving reflected light from said linear record area;
 an information reading unit for processing record medium reading signals obtained from said light reception element and obtaining decoded signals of said linear record;

a drive control unit for driving said light projection elements and said light reception element; and a record surface detecting unit for detecting whether the information record surface exists based on the record medium reading signal, and for supplying a record surface detection signal to said drive control unit when the information record surface is detected, wherein said drive control unit drives the plurality of light projection elements such that when the record surface detection signal is not supplied, the plural light projection elements emit light in a sequence, and when the record surface detection signal is supplied, all of the plural light projection elements emit light simultaneously.

2. An optical reading apparatus as set forth in claim 1, wherein said record surface detecting unit comprises a peak hold circuit for estimating a peak value of the record medium reading signal, and analog-to-digital converter for converting the peak value into a digital value, and a digital comparator for comparing the digital value with a reference digital value.

3. An optical reading apparatus as set forth in claim 1, wherein said record surface detecting unit comprises an analog-to-digital converter for converting the record medium reading signal into a digital value, a peak value memory for estimating a peak value of the digital value, and a digital comparator for comparing the peak value with a reference digital value.

4. A optical reading apparatus as set forth in claim 1, wherein said record surface detecting unit comprises an analog comparator for comparing the record medium reading signal with a reference analog value.

5. An optical reading apparatus comprising:

a plurality of light projection elements for projecting light to a linear record area on an information record surface;

a light reception element for receiving reflected light from said linear record area;

an information reading unit for processing record medium reading signals obtained from said light reception element and obtaining decoded signals of said linear record;

a drive control unit for driving said light projection elements and said light reception element;

a record surface detecting unit for detecting whether the information record surface exists based on the record medium reading signal, and for supplying a record surface detection signal to said drive control unit when the information record surface is detected; and a record detecting unit for counting a number of elements of said linear record based on the record medium reading signal and for supplying a record detection signal to said drive control unit when the number of elements in said linear record is equal to or greater than a prescribed number, wherein said drive control unit drives said plurality of light projection elements such that when at least one of the record surface detection signal and the record medium detection signal are supplied, all of the plural light projection elements emit light simultaneously, and when neither of the record surface detection signal and the record medium detection signal are supplied, the plural light projection elements emit light in a sequence.

6. An optical reading apparatus as set forth in claim 5, wherein said information reading unit decodes the linear record only when the record medium detection signal is obtained from said record detecting unit.

7. An optical reading apparatus as set forth in claim 5, wherein said record surface detecting unit comprises a peak hold circuit for estimating a peak value of the record medium reading signal, an analog-to-digital converter for converting the peak value into a digital value, and a digital comparator for comparing the digital value with a reference digital value.

8. An optical reading apparatus as set forth in claim 5, wherein said record surface detecting unit comprises an analog-to-digital converter for converting the record medium reading signal into a digital value, a peak value memory for estimating a peak value of the digital value, and a digital comparator for comparing the peak value with a reference digital value.

9. An optical reading apparatus as set forth in claim 5, wherein said record surface detecting unit comprises an analog comparator for comparing the record medium reading signal with a reference analog value.

* * * * *